United States Patent [19]

Miller

[11] Patent Number: 4,492,474

[45] Date of Patent: Jan. 8, 1985

[54] METHOD AND APPARATUS FOR ASCERTAINING COLOR BALANCE OF PHOTOGRAPHIC PRINTING PAPER

[76] Inventor: Bertram W. Miller, Apartado Postal 316, Chapala, Jalisco 45900, Mexico

[21] Appl. No.: 382,030

[22] Filed: May 26, 1982

[51] Int. Cl.³ .............................................. G01J 3/46
[52] U.S. Cl. ..................................... 356/404; 355/32; 355/77
[58] Field of Search ................... 356/404; 355/32, 35, 355/77, 88

[56] References Cited

U.S. PATENT DOCUMENTS 3,748,045  7/1973  Mitchell ............................... 355/32

Primary Examiner—F. L. Evans

[57] ABSTRACT

The color balance of photographic printing paper is determined by exposing one frame of the roll of negative film from which prints subsequently will be made with an image preferably from an especially prepared target-card. After processing, the negative or positive of the target-card exposure is printed on the paper being tested using a white-light exposure of known filtration, which is likely to be within correctable reach of the optimal filtration. The target-card bears a grid of superimposed lines which is used to measure the required filtration correction. The position of a desired neutral gray spot on the test print, which is the end-point of color balance determination, is found by matching against a standard paper gray scale.

11 Claims, 3 Drawing Figures

METHOD AND APPARATUS FOR ASCERTAINING COLOR BALANCE OF PHOTOGRAPHIC PRINTING PAPER

BACKGROUND OF THE INVENTION

This invention is related to the invention disclosed and claimed in U.S. patent application Ser. No. 382,254 filed contemporaneously with this application.

The present invention pertains to color balancing of photographic printing paper.

Although the present invention has application in various photographic processes, it is particularly useful with producing positive color prints on appropriate color printing papers from both color negatives and color positive transparencies by the white-light method of exposure, using materials known as integral tripacks which have three superimposed light-sensitive emulsion layers.

Those skilled in the art will appreciate that it is rarely if ever possible to produce a print with accurate color rendition without adjusting for color balance variations which are caused by color-mix changes in lighting conditions and changes in the characteristics of films and printing papers. Color printing processes provide considerable latitude in making color correction in printing by selective variation of red, green, and blue-light exposures. There are two principal techniques for making such exposure variations in present use. In tricolor additive printing, three separate exposures of the negative or transparency to the printing paper are made respectively through red, green, and blue separation filters, wherein the three exposures are varied to control color correction. Exposure of the printing paper to varying amounts of red, green, and blue light, hereinafter referred to as the primary colors of light, is thereby achieved. In white-light substractive printing, a single exposure of the original negative or transparency to the printing paper is made through a combination of colored filters, wherein the filter densities and colors are varied to control color correction, thereby selectively filtering out varying amounts of the primary colors of light. In either case, color control is achieved by selectively varying the exposure of the primary colors of light to the printing paper, exposure being basically the product of light intensity and duration. Such colored light variations produce corresponding variations in the production of appropriately colored dyes by the three emulsion layers, the product depending upon whether negative to positive, or positive to positive printing is being performed.

Except for U.S. Pat. Nos. 4,166,701 and 4,257,702 most prior art color balancing techniques employ visual color judgments using test prints. Such tests may be of typical subjects, in which case, in the white-light subtractive technique, the use of color filters for viewing a test print to make a subjective judgment as to filtering changes for making subsequent prints is in widespread use. Another technique is to use a matrix of cyan, magenta, and yellow dyes in steps equivalent to some multiple of "color correcting units" (i.e. 5 cc or 10 cc) to produce a trial or test print by printing through the matrix and then to make a visual judgment of the processed print relative to some standard such as a standard gray card. This matrix technique suffers from some irremediable defects. For example, there is no precise correlation between the indicated degree of correction and the units of color correction found in the enlarger colorheads of diverse manufacture. With the development of and gain in popularity of enlarger colorheads employing dichroic filters to effect color balance control the disparity between the matrix and the enlarger has been accentuated since the dyed acetate materials, or dye transfer dyes employed in matrices, have light absorption characteristics significantly different from those exhibited by the dichroic interference filters. Furthermore, the matrices universally are designed to work in discontinuous stepwise fashion at intervals sufficiently large to make small but significant differences in color balance difficult or impossible to ascertain. Another basic disabling defect of most matrix systems is that they attempt to test for three independent variables in a two-dimensioned system, which is manifestly impossible to do.

The two above-cited patents and the accompanying Application Ser. No. 382,254 completely describe non-objective techniques for ascertaining the color balance of color printing paper. The three disclosed techniques, however, do require printing by the tricolor method and the use of a color analyzer. The present invention allows the use of white-light printing and does not require the use of a color analyzer. Due to contrast variations from one lot of color film to another of the same brand, the precision of color balance obtainable with the method of the present invention is somewhat less than that obtainable with the other three cited techniques. Nevertheless, the present invention does result in color balance determinations which are a great improvement over those obtainable with any other white-light printing system, and well within the limits needed to produce acceptable color prints for commercial as well as amateur production.

The eye, quite correctly, has been described as the most discriminating instrument for detecting color differences when two samples are presented to it side by side. Sadly, it lacks the equally important faculty for precisely judging just how much difference there is between side by side samples. Some other technique must be sought by which color differences may be quantitated. The most simple and accurate technique in color printing by which difference may be measured is the precise measurement of the exposure difference which produces a definite color change.

The present invention combines the color comparing faculty of the eye with the precision of photosensitometry to control the color balance of photographic color printing. The present invention also circumvents the difficulty posed by three variables in a two dimensional system by holding one color, red for example, constant while varying the other two continuously against each other and against the fixed color, thus entirely doing away with one basic fault of existing matrix-dye systems of color balancing. The use of a target-card and conventional color negative film without recourse to dye-structure matrices makes the test results completely compatible with the printing method, obviating another basic fault of dye-matrix systems. Whatever blunting of accuracy is found derives from the assumption of a median gamma for the photographic color film. The small degree by which any particular lot of color film will vary from the median gamma will introduce a correspondingly small error in color balance, which deviation normally will not be found to be diabling.

SUMMARY OF THE INVENTION

In accordance with the present invention, the color balance of color photographic printing paper of the type having superimposed emulsion layers is ascertained by the use of an especially prepared target-card, hereinafter called the card, having characteristics in general and in common with the test print produced by a corrected color printing program in the invention of application Ser. No. 382,254, filed contemporaneously with this application. The aforementioned application Ser. No. 382,254 is hereby incorporated herein by reference. Briefly, the card bears a uniform cyan color of appropriate reflection density over its full expanse. A magenta color, whose reflection density varies with distance linearly, with maximum density at the left side of the card and minimum density at the right side of the card, is laid over the cyan density. A yellow color, whose reflection density varies linearly with distance, with minimum density at the top of the card and maximum at the bottom of the card, is superimposed on the cyan and magenta densities. Finally, a grid is imprinted over the entire card with the major axes of the grid intersecting in the midpoint of the card. The cyan, magenta, and yellow colors have their densities so selected as to produce neutral gray color at the intersection of the major axes (0,0). The nominal value for neutral gray reflection density at the intersection of the axes is preferably 0.70. The values indicated for the grid markings are the correction factors for printing filtration corresponding to the desired degree of print density change. Those experienced in the art will appreciate that there is a relationship between the grid markings and the median gamma of a given brand of color film.

The card is carefully photographed under the same lighting and camera lens conditions which will pertain to negatives of other subjects exposed on the same roll of film. The film is processed after all frames have been exposed. The negative of the card is used to make a test print using enlarger colorhead filtration which previous experience has shown will produce a print from the combination of color printing paper and film which will be within striking distance of correctability to good color balance. The test print is given standard processing.

Using a paper gray scale whose steps are approximately 0.10 units of reflection density apart and each of whose steps bears a round perforation, the exact area of the test print which most closely resembles the gray neutrality of the step of the gray paper scale most closely approximating the density of the test print is sought. Once found, the neutral gray area of the test print is marked. The vertical lines of the grid are used to measure the distance from the principal vertical axis, which distance is the measure of the green exposure correction. When the neutral gray area of the test print lies to the right of the vertical axis the correction will be in positive or additional units of magenta filtration at the enlarger colorhead. When the neutral gray area of the test print lies to the left of the vertical axis the correction will be negative or in diminished units of magenta filtration at the enlarger colorhead. The horizontal lines of the grid are used to measure the distance of the neutral gray area from the principal horizontal axis. When the neutral gray area lies above the horizontal axis the correction will be in positive units of yellow filtration at the enlarger colorhead. When the neutral gray area of the test print lies below the horizontal axis the correction will be in negative units of yellow filtration at the enlarger colorhead.

Those skilled in the art will have little difficulty in realizing that color printing papers of different classes, such as positive to positive and negative to positive papers, are designed to have degrees of contrast which particularly suit them for printing from the appropriate original, as the case may be. Therefore, from one lot of paper to another of the same brand, paper will have the same gamma (contrast) within small limits of variation. Such being the case, tables of exposure correction may be constructed for each brand of printing paper which would allow the user to find the correct amount of log exposure correction for overall density based upon the value, interpolated or direct, of the density of the matching step(s) of the paper gray scale.

BRIEF DESCRIPTION OF THE DRAWINGS

The novel features believed characteristics of the invention are set forth in the appended claims. The nature of the invention, however, as well as its essential features and advantages, may be understood more fully upon consideration of illustrative embodiments when read in conjunction with the accompanying drawings wherein:

DESCRIPTION OF THE PREFERRED EMBODIMENTS

Figure 1:
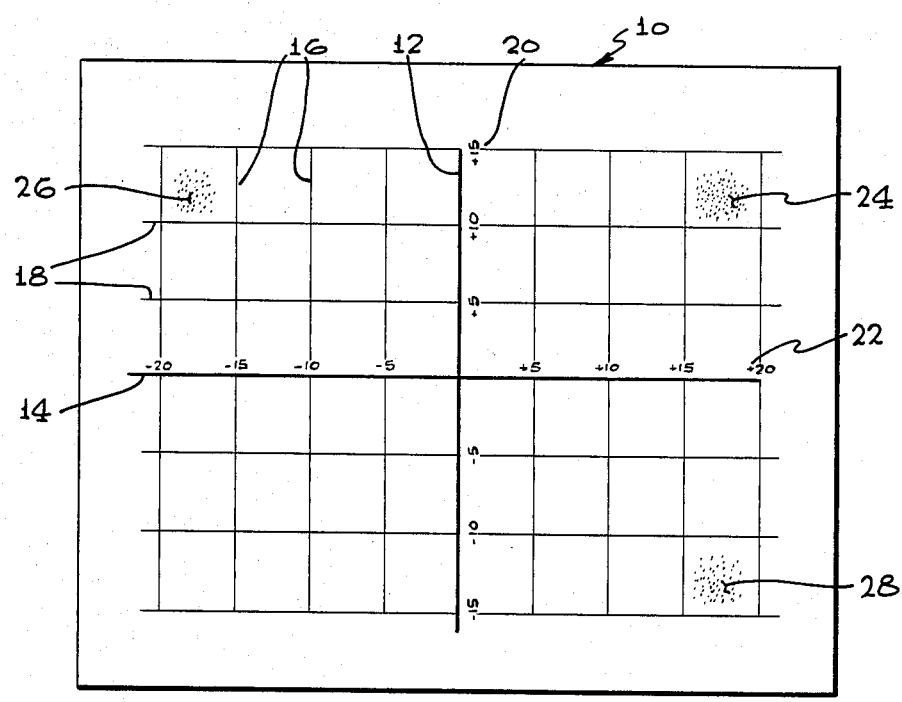
FIG. 1 is a plan view of the target-card for use with the present invention.

FIG. 1 is a black and white illustration of the target-card 10 which has imprinted on it a vertical axis 12 and a horizontal axis 14. Parallel with the vertical axis 12 are a series of lines 16, which, taken together with a series of lines 18 parallel with the horizontal axis 14, form a grid over the entire surface of the target-card 10. Each grid line 16, 18 at its intersection with a major axis 12 or 14 bears a numerical value 20 such as 0.02, 0.04, etc. and a sign 22 which is either plus or minus, the former along the horizontal axis to the right of the center and along the vertical axis superior to the center, with the latter along the horizontal axis to the left of center and along the vertical axis inferior to the center. An overall color of uniform density 24 is found over the whole surface of the card. Additionally, a color of linearly varying density 26, diminishing from maximum density at the left side of the card to its minimum density at the right side of the card is superimposed on color density 24. Another color of linearly varying density 28 which diminishes from a maximum density at the bottom of the card to a minimum density at the top of the card overlies the two colors 24 and 26. Preferably, the gradients of both linearly varying primary colors 26, 28 are identical. At the exact center of the card 10 at the crossing of the vertical axis 12 and the horizontal axis 14 the three superimposed color merge to neutral gray, whose density approximates 0.70 reflection density units. Those skilled in this art will recognize that density is a logarithmic function of common definition.

Figure 2:
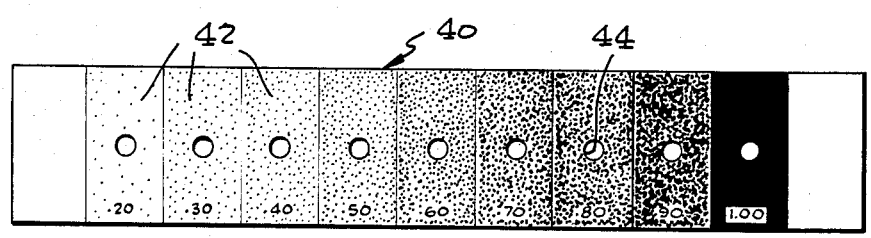
FIG. 2 is a plan view of the paper gray scale for use with the present invention.

FIG. 2 illustrates the paper gray scale 40 which in this embodiment is composed of nine steps 42, each of which differs from its neighbor by 0.10 density units of reflection density. The least dense step has a reflection density of 0.20 and the most dense step 1.00. In the center of each step is a round perforation 44.

A preferred method of practicing the present invention will now be described by way of an illustrative example. The target-card 10 is placed in the principal light by which the rest of a roll of negative color film has been or will be exposed. Care is taken that the camera be held directly above the target-card 10 to minimize rectilinear distortion, and that the angle of illumination of the target-card 10 be such as to eliminate completely any trace of specular reflection from the surface of the target-card 10 to the camera lens. Care is also taken so to photograph the target-card 10 as to fill the negative form as best as possible with the full image of the target-card 10. Further, it is important that care be taken in focussing the camera so that the resulting negative will reproduce the markings of the target-card 10 as sharply as possible. Using the art available to all skilled photographers an exposure is selected which will produce a well exposed negative and the target-card 10 is photographed.

After all the frames of the roll of color negative film have been exposed, the roll is processed. At the time when it is desired to make positive color prints of the negatives on the processeed roll of film, the negative of the target-card 10 is first placed in the negative carrier of the enlarger, and the latter is adjusted in height and focus to project the image of the target-card 10 so as almost to fill the format of the enlarging color print paper being used. The filtration of the color head of the enlarger is set to some combination which in the past has produced satisfactory or nearly satisfactory positive color prints from the combination of other lots of the same brand of paper and the same brand of color negative film. The lens aperture of the enlarger and the exposure time is likewise related to some combination successfully used in the past for a similar degree of enlargement with color negatives of similar overall density. With such adjustments completed and noted an exposure is made on the color printing paper under test of the negative of the target-card 10. The exposed print is given standard processing and dried.

The test print, hereinafter referred to as the print, is placed on a worktable under light approximately equivalent in color and intensity to the light under which production color prints will commonly be viewed. It will be noted that the print is a facsimile of the target-card 10 in its diversity of colors, except that the area of neutral gray which is found at crossing of the major axes of the original will most likely be found in some other place in the print. The relation of this "other place" to the crossing of the major axes in the print are the measures by which the original trial filtrations of the enlarger colorhead must be modified to produce excellent color balance in prints made subsequently from this lot of color printing paper and this roll of negatives in color. To aid in arriving at a precise judgment of the area of the print which is truly neutral gray, recourse is made to the paper gray scale 40 of FIG. 2. The paper gray scale 40 is laid over the print. The step 42 of the paper gray scale 40 most closely approximating the overall density of the print is selected. While viewing the underlying print through the perforation 44 in the selected step 42, the paper gray scale 40 is moved over the surface of the print until a print is arrived at where the print, as viewed through the perforation 44 of the selected step 42, most closely resembles the latter in its neutral grayness. The center of the selected portion of the print visible in the perforation 44 is then marked for example, by pricking it with some sharp suitably pointed instrument. The paper scale 40 is then put aside.

The coordinates of the mark on the print are taken for both sign and value by reference to the nearest vertical grid line in the case of the horizontal coordinate and by reference to the nearest horizontal grid line in the case of the vertical coordinate. The horizontal coordinate is the amount by which the green-light exposure must be corrected in terms of changes in the magenta filtration at the enlarger colorhead. The vertical coordinate is the amount by which the blue-light exposure must be corrected in terms of changes in yellow filtration at the enlarger colorhead. The overall exposure of the print may be corrected, if necessary, by referring to a table of exposure corrections based on the direct or interpolated value of the gray density of the print as estimated by use of the paper gray scale 40.

With the appropriate corrections in hand: green-light exposure correction, blue-light exposure correction, and overall density exposure correction, all that remains to be done is to modify the appropriate adjustment for each at the enlarger colorhead and at the lens aperture or exposure timer to insure that replacement of the test negative of the target-card 10 by a production negative of another subject from the same roll of color negative film will result in a very well-balanced color print.

Figure 3:
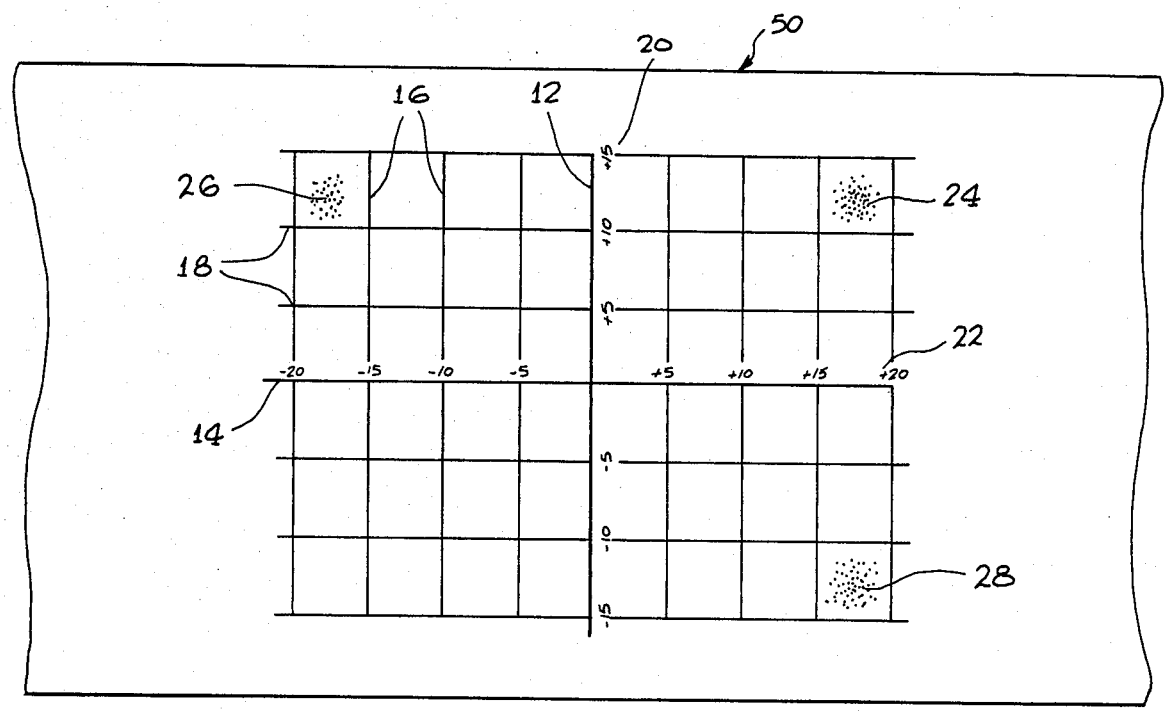
FIG. 3 is a plan view of a frame of color film imaged with a test image using the target-card of FIG. 1.

Those skilled in this art will readily appreciate that the just described method and apparatus may be used to produce standard negatives for a given brand or type of color negative film. Once such standard negatives are produced by imaging a frame of film with the image described with reference to FIG. 1 and developing the frame, the standard negative may be sold or otherwise provided to users who will use them to make serial comparisons of different lots or emulsion numbers of a given brand of color printing paper. The data obtained by these comparisons may be readily used to modify already determined printing conditions for negatives used with one lot of the printing paper to produce correctly balanced prints from other lots of the same brand of printing paper. Moreover, during the manufacture of color negative film, a frame on each roll may be exposed using with the image described with reference to FIG. 1 prior to packaging. Thus the present invention may be used to produce undeveloped, standard negatives on a given brand or type of color negative film. In this case the user automatically tends to the development of the standard negative when the roll of film is processed. A frame of film 50 exposed with the image described with reference to FIG. 1 and substantive to processing is shown in FIG. 3. As before, such standard negatives may be used for serial comparisons of different lots or emulsion numbers of the same brand of color printing paper and the data obtained by such comparison may readily be used to modify already known printing conditions for negatives used with one lot of printing paper to produce correctly balanced prints from other lots of printing paper of the same brand.

While the benefits of this invention are particularl directed to the white-light printing method they may readily be extended to tricolor additive printing as well. Similarly, it benefits negative to positive printing and positive to positive printing equally well. It is universal in its scope and application. Thus, while the invention has been described in particular detail with reference to white-light negative-to-positive printing he invention itself is not limited to that specific embodiment, except as required by the appended claims.

The target-card 10 may be produced by conventional color printing on tripack materials. It may also be produced by normal dyetransfer printing or by an almost unlimited variety of photo mechanical means whose choice will be governed by cost and the accuracy of the target-card produced.

The target-card colors have been described with reference to one system of primary colors. Of course, the present invention may also be practiced using other primary color systems, if desired.

Although preferred embodiments have been described herein, it is to be understood that various changes, substitutions and alterations can be made therein without departing from the scope of the invention as defined in the appended claims.

I claim:

1. A method for ascertaining the color balance of color photographic printing paper of the type having three superimposed light-sensitive emulsion layers, each of which is selectively responsive to a different primary color of light, comprising the steps:

(a) photographing a target-card on each roll of color film from which it is desired to make positive color prints, under conditions common to other exposures made on the same roll of film, said target-card having three primary colors printed thereon, a first primary color being printed in essentially uniform density over a given area, a second primary color being printed with essentially a linearly varying density over said given area and a third primary color being printed with essentially a linearly varying density over said given area, the axes of the linearly varying second and third primary color being disposed at a predetermined angle to each other;

(b) developing the color film and printing the resulting negative or transparency on the color printing paper under test with an enlarger having a colorhead filter unit;

(c) processing the exposed test print; and (d) identifying the estimated overall density of the test print and the coordinates of a small area of neutral gray in the test print, the estimated overall density being indicative of needed correction for overall density in subsequent prints and the coordinates being indicative of the measure of required filtration changes at the enlarger colorhead to produce balanced color in subsequent prints made on the same lot of color printing paper from the same roll of negatives or transparencies.

2. The method of claim 1, wherein said axes of said linearly varying color densities are disposed at a right angle to each other and wherein said target-card further includes a system of axes printed thereon parallel with said axes of said linearly varying color densities.

3. The method of claims 1 or 2, further including the step of preparing said target-card.

4. The method of claims 1 or 2, further including the step of adjusting the filtration of said colorhead and the aperture and exposure time of said enlarger prior to performing step (b) by using a selected combination of colorhead filtration aperture and exposure time previously successful in printing other lots of similar film and paper.

5. A target-card for use in ascertaining the color balance of photographic printing paper, said card having:

(a) a layer of a color of uniform density, said color being one of the primary colors;

(b) a coincident layer of a different primary color whose density varies linearly with distance horizontally across the card, said density being a logarithmic function;

(c) a coincident layer of a third primary color whose density varies linearly with distance vertically across the card; and (d) a grid coincident with the aforementioned colors, said grid composed of horizontal and vertical lines, the major axes of said grid crossing at the center of the grid, the pigments of said primary colors being selected such that a net color of neutral gray is found at said center, the intersection of each grid line with a major axis being marked with a filtration correction composed of a signed number, the spacings of the grid lines and the marked corrections being preselected based upon the gamma of an average sample of the film to be used.

6. In a method of determining the color balance of photographic printing paper, the step of imaging a frame of color film with a test image, said test image including three primary colors, a first primary color having an essentially uniform density over a given area of the image, a second primary color having an essentially linearly varying density over said given area, and a third primary color having an essentially linearly varying density over said given area, the axes of the linearly varying densities of said second and third primary colors being disposed orthogonally to each other and further including the steps of developing said frame; printing said frame on color printing paper using an enlarger with a colorhead; identifying a small area on the print having a desired neutral gray; measuring the coordinates of said small area of neutral gray; and adjusting the filtration of said colorhead based on the results of the measuring step.

7. The method of claim 6, wherein the gradient of both said linearly varying color densities are the same.

8. A frame of color film imaged with a test image, said test image including three primary colors, a first primary color having an essentially uniform density over a given area of the image, a second primary color having an essentially linearly varying density over said given area, and a third primary color having an essentially linearly varying density over said given area, the axes of the linearly varying densities of said second and third primary colors being disposed orthogonally to each other.

9. The frame of color film as defined in claim 8, wherein the gradient of both said linearly varying color densities are the same.

10. The frame of color film as defined in claim 8, wherein the color film is exposed by the test image and the film is subsequently developed to fix an image of the test image thereon.

11. The frame of color film as defined in claim 8, wherein said frame is a frame exposed on an otherwise unexposed roll of color film.

* * * * *